(No Model.)

A. B. GRUBB.
HOODWINK.

No. 425,782. Patented Apr. 15, 1890.

Witnesses:
Fred G. Dieterich
Amos W. Hart

Inventor:
Amaziah B. Grubb.
By Munn & Co.
Attorneys.

UNITED STATES PATENT OFFICE.

AMAZIAH B. GRUBB, OF GOOSE LAKE, IOWA.

HOODWINK.

SPECIFICATION forming part of Letters Patent No. 425,782, dated April 15, 1890.

Application filed July 11, 1888. Serial No. 279,694. (No model.)

*To all whom it may concern:*

Be it known that I, AMAZIAH B. GRUBB, of Goose Lake, in the county of Clinton and State of Iowa, have invented a new and useful Improvement in Hoodwinks, of which the following is a specification.

My invention is an improvement in that class of hoodwinks or blinders which are particularly adapted for use on vicious horned cattle for the purpose of hindering their attempts to gore other cattle and persons, also from throwing or jumping fences, &c.

In carrying out my invention I have in view to provide a hoodwink which shall be safe, easy, and comfortable for the animal to which it is applied and offer the least obstruction to vision which is compatible with due hinderance of vicious attacks on persons and other objects.

Figure 1:
Figure 2:
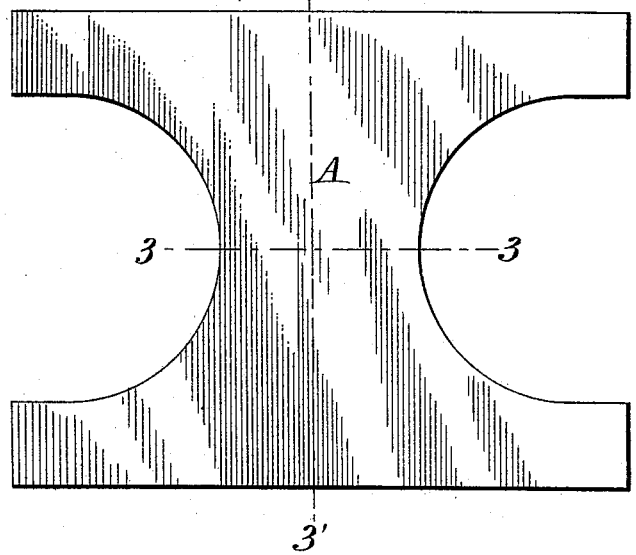

In the accompanying drawings, Figure 1 is a perspective view showing my hoodwink attached to the head of a horned quadruped in the manner required for practical use. Fig. 2 is a plan or face view of the leather piece to which the winkers and straps of the hoodwink are attached. Fig. 3 is a central cross or horizontal section on line 3' 3', Fig. 2. Fig. 4 is a longitudinal section of the same on line 3 3, Fig. 2.

The body A of the hoodwink is formed of an approximately square piece of thick leather or equivalent flexible but semi-rigid material. Mainly for convenience of reference, the part A may be termed a "shield." The same is cut out on the sides at opposite points to provide for attachment of the winkers or blinders proper B. The latter are constructed of thin cast metal, preferably iron, and have a concavo-convex form. They are attached to the shield A by means of rivets through their base-flanges, whose curvature conforms to that of the cut-out portions of the shield. Thus the said winkers project forward from the face of the latter, their convex outer sides being toward each other and their concave inner sides being outward.

In practice a narrow plate-spring C is riveted to the face of the shield midway between the winkers B and extends downward an inch or two below the shield. Its free lower end is curved outward and carries a sharp-pointed pin $c$, which serves to prick the animal's nose in case of an attempt to overthrow a fence by pressing against it.

The means for attaching the hoodwink to the head of a horned animal are three straps $d'$ $d^2$ $d^3$. The first and third straps $d'$ $d^3$ are made adjustable in length by means of buckles and attached to the respective upper and lower corners of the shield A, and pass, respectively, around the base of the animal's horns and around its jaws, as shown in Fig. 1. The second strap $d^2$ is secured to the middle top portion of the shield A and passes over the top of the animal's head, being provided at its upper end with a loop, through which the horn-strap $d'$ passes, as shown in Fig. 3. Thus constructed, my hoodwink possesses marked practical advantages over others consisting, mainly, of a rigid board or skeleton frame.

The leather plate or shield A, being soft and flexible, cannot chafe, bruise, or otherwise injure the animal's head; yet it is sufficiently stiff or rigid to hold the winkers in the required position. The shape and arrangement of the winkers are also important features, since they allow free access of air and light laterally to the animal's eyes and permit free vision in all directions save in front.

What I claim is—

The improved hoodwink consisting of the flexible leather face-plate having suitable attachments for securing it to a bullock's head, and whose sides are cut out, as specified, and the metal winkers B B, which have a concavo-convex shape and are riveted to the front of the said face-plate around the edges of the cut-out portions and arranged with their concavities outward, as shown and described.

AMAZIAH B. GRUBB.

Witnesses:
PETER AUGUST GOHLMANN,
HENRY J. WEBSTER.